US009826189B2

(12) United States Patent
Borghesani (10) Patent No.: US 9,826,189 B2
(45) Date of Patent: Nov. 21, 2017

(54) APPARATUS, METHOD, AND COMPUTER PROGRAM PRODUCT FOR PRESENTING AN INTERACTIVE PROGRAMMING GUIDE (75) Inventor: Linda I. Borghesani, Acton, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1117 days.

(21) Appl. No.: 11/770,352

(22) Filed: Jun. 28, 2007

(65) Prior Publication Data
US 2009/0007173 A1 Jan. 1, 2009

(51) Int. Cl.
H04N 5/445 (2011.01)
H04N 21/434 (2011.01)
H04N 21/45 (2011.01)
H04N 21/482 (2011.01)
H04N 21/84 (2011.01)

(52) U.S. Cl.
CPC ..... H04N 5/44543 (2013.01); H04N 21/4348 (2013.01); H04N 21/4532 (2013.01); H04N 21/482 (2013.01); H04N 21/84 (2013.01)

(58) Field of Classification Search
USPC .................................................... 725/37–61
See application file for complete search history.

(56) References Cited

U.S. PATENT DOCUMENTS

| 4,977,455 A | 12/1990 | Young |
|---|---|---|
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |

(Continued)

Primary Examiner — Michael Telan (57) ABSTRACT

Apparatuses, methods, and computer program products for presenting an interactive programming guide are provided. An embodiment may include providing an apparatus configured to deliver media programs and an interactive programming guide to a monitor to be viewed by a user. The interactive programming guide may list channels and media programs available to the user. The apparatus may be configured to filter the interactive programming guide by limiting the channels and media programs listed in the interactive programming guide based on one or more attributes of the media programs. The user may be able to choose the attributes to be used as the filter either through a current media program being watched by the user or through the interactive programming guide. The attributes may be identified through metadata associated with the media programs.

21 Claims, 4 Drawing Sheets

(56) References Cited

U.S. PATENT DOCUMENTS

| | | |
|---|---|---|
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 * | 1/2001 | Alexander et al. ............. 725/52 |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 6,865,746 B1 * | 3/2005 | Herrington et al. ............ 725/53 |
| 6,898,762 B2 * | 5/2005 | Ellis ....................... H04H 60/31 |
| | | 348/E7.063 |
| 7,039,935 B2 | 5/2006 | Knudson et al. |
| 7,069,576 B1 | 6/2006 | Knudson et al. |
| 7,487,529 B1 | 2/2009 | Orlick |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0078453 A1 * | 6/2002 | Kuo ............................... 725/46 |
| 2002/0087988 A1 * | 7/2002 | Lipscomb et al. .............. 725/51 |
| 2002/0124255 A1 | 9/2002 | Reichardt et al. |
| 2002/0170057 A1 * | 11/2002 | Barrett ............... H04N 5/44543 |
| | | 725/41 |
| 2002/0184650 A1 * | 12/2002 | Stone .......................... 725/131 |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0086692 A1 * | 4/2005 | Dudkiewicz ....... H04N 5/44543 |
| | | 725/46 |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2007/0136757 A1 * | 6/2007 | Cormack ........... H04N 5/44543 |
| | | 725/47 |
| 2007/0266028 A1 * | 11/2007 | Muller .............. G06F 17/30017 |
| 2008/0301739 A1 * | 12/2008 | Goldeen et al. ................ 725/88 |
| 2009/0077589 A1 * | 3/2009 | Boyer et al. .................... 725/46 |

* cited by examiner

APPARATUS, METHOD, AND COMPUTER PROGRAM PRODUCT FOR PRESENTING AN INTERACTIVE PROGRAMMING GUIDE

BACKGROUND

Since the advent of the remote control, many television watchers have become flickers, i.e., they flick through channels trying to find and watch media programs. The numbers of channels offered to viewers has been increasing, with some viewers having over 200 channels from which to choose. As the number of channels increases, the time to flick through the channel increases.

Some media providers provide television guides and interactive programming guides to help viewers find programs to watch. A television guide may be in a form of a dedicated channel that automatically scrolls through a channel listing and displays the media programs per channel for the next few hours. An interactive programming guide may also display channels and media programs per channels. Unlike a television guide, a viewer may be able to navigate through the interactive programming guide by scrolling through the channels in the direction that the viewer wants. The viewer may also be able to scroll forward in time to view the channels and the programs on the channels for future time periods. The interactive programming guide may also allow the viewer to select a particular program to watch or to provide additional information about the program. In some cases, the viewer may select a particular program to be recorded by a digital video recorder associated with the interactive programming guide.

Even with interactive programming guide, the number of channels and programs may make it challenging for some viewers to find the programs they want to watch in a timely manner. Recommenders have been developed to assist viewers in selecting programs. In general, a recommender is a system that monitors the programs watched in the past by a viewer and tries to predict other programs that would be of interest to the viewer based on the past programs. The recommender may also take into consideration other information provided by the user. However, many viewers have privacy concerns with the monitoring of their past viewing habits or about the collection of information about them.

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
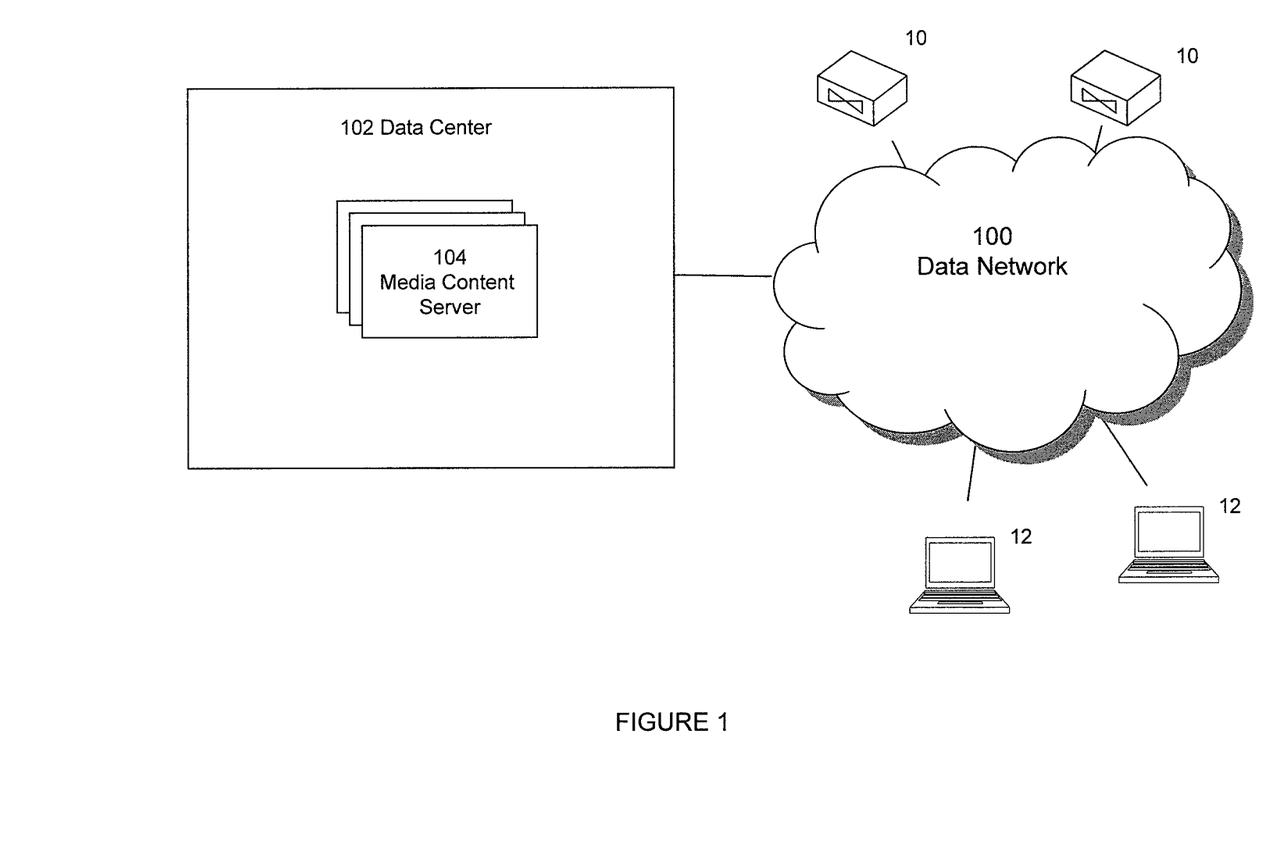
FIG. 1 is a block diagram of a data network consistent with an exemplary embodiment.

Embodiments relate to apparatuses, methods, and computer program products for presenting an interactive programming guide. FIG. 1 illustrates a data network consistent with an exemplary embodiment. The data network may include a Wide Area Network ("WAN"), a Local Area Network ("LAN"), an intranet and/or the Internet. As a more specific example, at least part of the data network may be part of a fiber optic network, such as fiber-to-the-home ("FTTH"), fiber-to-the-premises ("FTTP"), fiber-to-the-curb ("FTTC"), fiber-to-the-X ("FTTX") and other fiber optic networks of one or more media and telephone service providers configured to deliver services to a number of users or subscribers. In an alternative embodiment, at least part of the data network may include a wireless network or a direct satellite broadcast network.

As illustrated, one or more computing devices and/or peripheral devices may be within or connected to the data network 100. The computing devices may include servers, desktops and laptops 12 and have various communication programming applications including, for example, email and an Internet browser. Another communication device may be a set top box 10. The set top box 10 may be configured to receive one or more signals representing a media program from an external source and convert the signals into the media program for display on a television that is in communication with the set top box. As an example, the external source may be a data center 102. The data center 102 may include one or more media content servers 104 (collectively, the media content servers may be referred to as a content server farm). The media content servers 104 collectively provide at least some of the storage and processing functions for a media provider for delivering the media programs to the set top boxes and/or other computing devices of the data network. Although the data center 102, the set top boxes 10, and the computing devices 12 are shown with direct connections to the data network 100 any number and type of network elements may be interposed between the data center 102, the set top boxes 10, and the computing devices 12.

Figure 2:
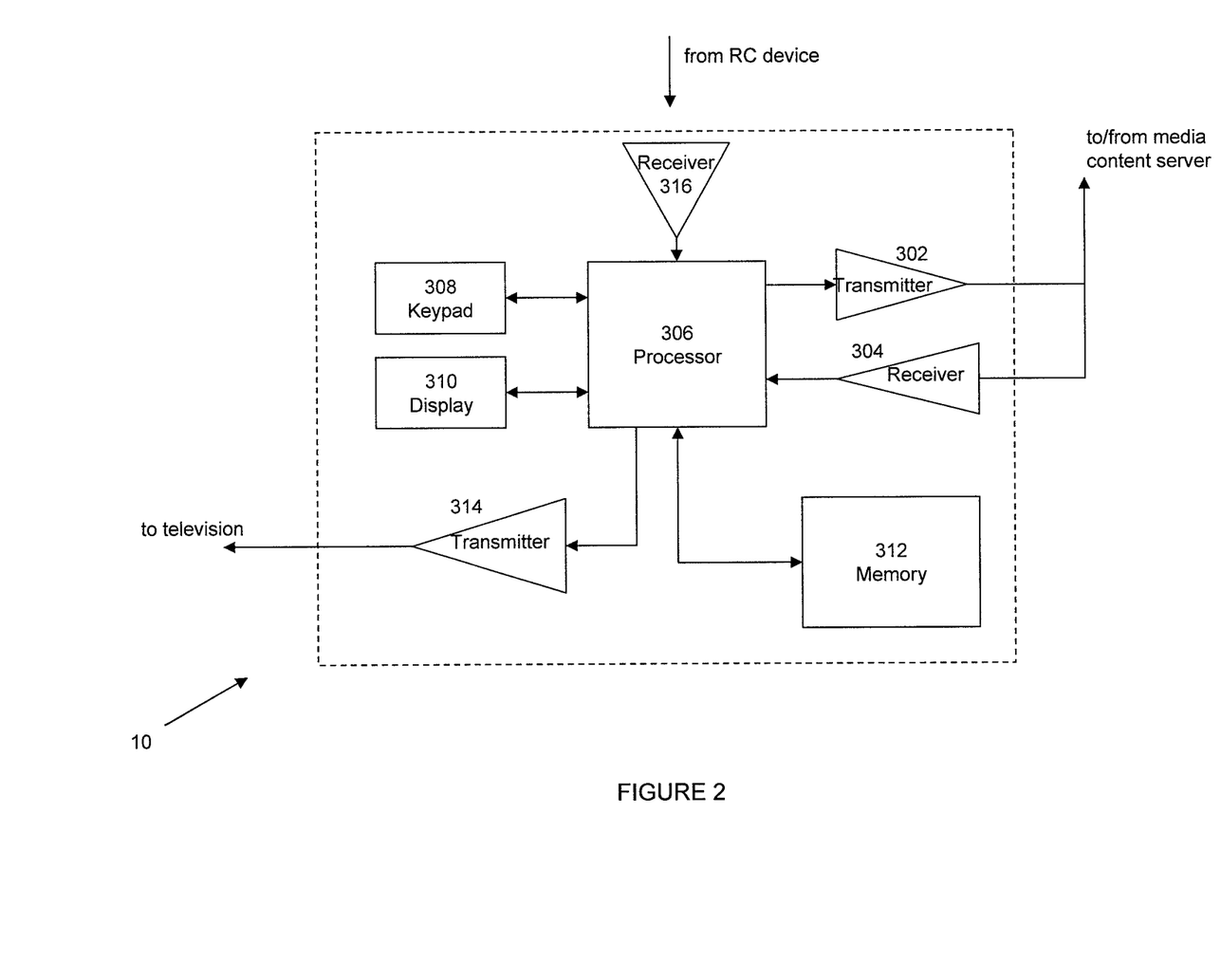
FIG. 2 is a block diagram of a set top box consistent with an exemplary embodiment.

As shown in FIG. 2, a set top box 10 may include a first transmitter 302, a first receiver 304, a processor 306, a keypad 308, a display 310, at least a first memory element 312, a second transmitter 314, and a second receiver 316. The first receiver 304 is configured to receive the media program from the external source through the data network 100. For example, the set top box may include an adapter or port for receiving a fiber optic cable or a coaxial cable of the data network. The external source may be the one or more media content servers or other computing devices of a media provider that is communicatively coupled to the set top box through the data network. The processor 306 may be configured to provide processing and command functions, which may include translation or conversion of the received signals into an output suitable for display on the television. The processor 306 may also be configured to send the media program through the second transmitter 314 of the set top box 10 to the television. Although not illustrated, the media set top box may have a third transmitter and the processor 306 may be configured to process the received signals into two outputs, e.g., a video output sent through the second transmitter for display on the television and a sound output sent through the third transmitter to a sound system either integrated with the television or a stand alone system. The display of the set top box may include information such a clock and/or the current channel for the television, and/or indicators on whether or not the set top box is on and/or whether it is recording. The keypad 308 may include one or more buttons to allow a user to enter commands and selections into the set top box 10. The second receiver 316 may be configured to receive radio signals from a remote control device (not illustrated) as another method of receiving commands and selections from a user. The processor 306 may also be configured to send a request through the first transmitter 302 to the media provider for particular media program(s) based on commands and selections from the user. The request may include a live media program or a video on demand ("VOD") asset. The processor 306 may also record the signals for the requested media program into the memory element 312 based on commands and selections from the user (e.g., the set top box may include a digital video recorder ("DVR")). For example, the user may request for a future program to be recorded. At the scheduled time for the media program, the processor 306 may request the corresponding signals for the media program, also referred to herein as media programming signals, and store the media programming signals into the memory element. The stored or recorded media program is viewable to the user upon request. In particular, the processor 306 may retrieve a recorded program from the memory element 312 and send it to the television to be viewed by the user upon request from the user. The memory element 312 may also maintain programming instructions, i.e. software, pertaining to the functions and operability of the set top box.

The set top box 10 may also be configured to receive signals from the media provider that represent an interactive programming guide ("IPG") for the user. In particular, upon request from the user, the processor 306 sends a request to the media provider for the signals that provide the IPG. In response to the request, the media provider sends the IPG to the set top box. The IPG may be customer specific, e.g., the media provider may send an IPG that corresponds to an account of the user, which may take into consideration the channels available to the user based on the location of the set top box and the subscription of the user, e.g., a basic channel package or a channel package with premium channels.

The processor 306 may send the IPG to the television for viewing by and interaction with the user. The IPG may display a listing of channels, times, and programming and the user may browse through the listing through either the keypad 308 or remote control device. In general, the IPG provides a graphic user interface ("GUI") for the user and, through this GUI, the user may be able to select programs to watch or to be recorded, call up recorded programs, and/or order video on demand assets. The processor 306 may either execute the selections or store them within the memory element 312 for future execution.

The processor 306 may be further configured to process or filter the IPG by removing information that would be displayed on the IPG, based on a command from the user. The media programming signals may include metadata. For example, the media programming signals for the IPG may include metadata for one or more of the channels and/or media programs for the channels with the metadata utilized by the processor to filter the IPG. In response to a command from the user, the processor may process the media programming signals such that channels and media programs of the IPG viewed on the television are filtered, or not, based on the metadata for each of the channels and media programs. As an example, a user may be watching a media program that is considered a particular genre, such as sci-fi. The processor may determine the genre based on the metadata associated to that particular media program. The user may enter a command, such as through the keypad or the remote control device, to browse other sci-fi media programs through the IPG. The processor may filter the channels and/or media programs that are considered sci-fi according to the associated metadata and transmit the filtered IPG to the television. As used herein "filtered IPG" is the presentation of the IPG in which information about one or more channels and/or media programs have been removed from the presentation in response to a command from the user. Therefore the user may view an IPG with only sci-fi media programs that are available either presently or within a predetermined future time period without having to browse through non sci-fi media programs. Sci-fi and other genres are only an example of an attribute in which the channels and/or media programs may be filtered. Other attributes may include, but are not limited to, new episodes v. reruns; any media program having or associated with a particular actor, actress, director, movie studio, etc; types of media programs, such as movies, sitcoms, series, specials, live events, etc; a rating for the media program, such as R, PG-13, G, etc; and a time period in which the media program was first aired, shown, or produced. The processor may also filter based on a combination of attributes.

The manner in which the viewer enters the command to filter the media programs based on one or more attributes may vary. For example, the viewer may be able to select a button on the remote control device while or within a predetermined time after watching a media program, selection of the button may cause a command to be sent to the processor to provide an IPG that lists only the media programs that are similar to the media program that the user is watching or just got done watching. "Similar to" may be defined by one or more attributes described in the metadata associated with the media program that the user is watching. For this example, the metadata may be transmitted along with the media programming signals for the media program.

The filter may be constructed to identify only episodes of the same media program. As a specific example, if the viewer was watching a sitcom, such as Kings of Queens, the filter may show only other episodes of the same sitcom; in this case only other episodes of Kings of Queens will appear in the filtered IPG. As another example, the filter may be constructed to identify other media programs of the same genre as the media program that the user is watching or just got done watching. The processor may be configured to provide the filtered IPG until the viewer provides additional commands or just for the current session, i.e., the filter is applied once and the next time the user views the IPG, the filter will be inoperative unless other commands are given.

As another example, the viewer may enter commands or filters through the IPG. According to this example, the viewer may select the IPG, browse through the channels and media programs using the IPG, and enter commands to filter the channels and/or media programs by one or more attributes. The IPG may provide one or more screens that allow the user to view and select one or more attributes. The viewer may also be able to select a media program and look at least partially at the metadata associated with that media program. The viewer may use the metadata associated with that media program as a format to select one or more attributes listed in the metadata to be used as a filter.

Figure 3:
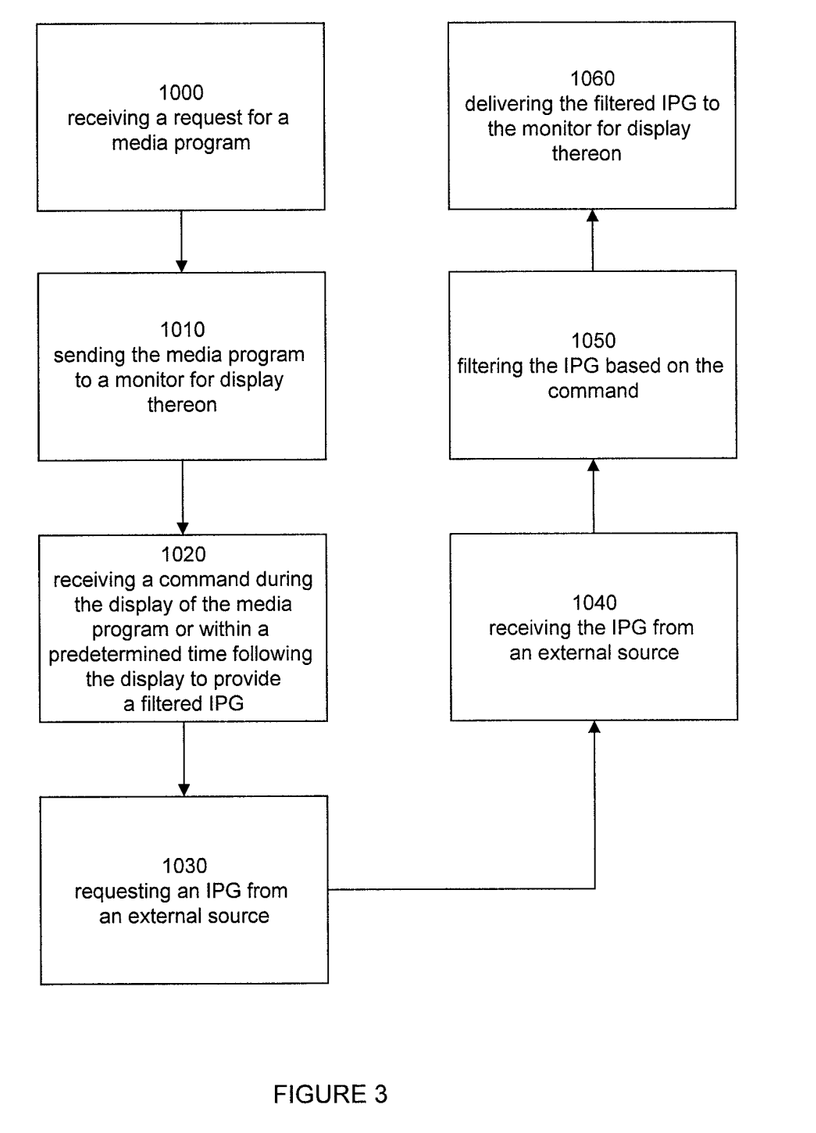
FIG. 3 is a flow chart illustration of a method according to an exemplary embodiment.

FIG. 3 illustrates a method that is consistent with an exemplary embodiment. The method may include receiving a request for a media program from a user 1000; sending the media program to a monitor for display thereon 1010; receiving a command from the user during the display on the monitor of the media program or within a predetermined time following the display to provide a filtered IPG 1020; requesting an IPG from an external source 1030; receiving the IPG from an external source 1040; filtering the IPG based on the command from the user 1050; and delivering the filtered IPG to the monitor for viewing by the user 1060.

The request for the media program from the user may be for a live media program, i.e., a media program being broadcasted, for a recorded media program that is stored within the memory element of the set top box or other computing device, or for a video on demand asset. Media programming signals may be provided with the media program. Alternatively, the method may further include requesting the media programming signals for the media program from an external source, such as a media content service of a media provider. The media programming signals may include metadata that provides one or more attributes or other information about the media program. In this exemplary embodiment, a user executes a command requesting a filtered IPG at 1020. The command received by the set top box from the user may be from a remote device or keypad of the set top box or other computing device. According to this embodiment, the command is received either during or within a predetermined time following the viewing of the media program, which may be collectively referred to as being in a "temporal proximity" with the viewing of the media program. The predetermined time following the media program may include a specified number of minutes after the end of the media program. For example, it may be 1, 2, 3, 4, etc. . . . minutes after the end of the media program. Or the predetermined time may be determined by the start of another media program either through another command by the user or by a schedule established by the media provider or a particular channel.

The IPG may be requested and received from the data center or, more particularly, a media content server. The filtering of the IPG may include determining one or more of the media programs listed in the IPG that includes one or more of the same attributes as the media program currently or recently viewed by the user. The one or more attributes may be stored within the set top box or other computing device in association with the respective media program. In an alternative embodiment, the processor may request and receive the metadata or, more particularly, the attributes for the media program from the data center in response to receiving the command from the user.

The operations of FIG. 3 may be performed through hardware, software, or combination thereof. Therefore embodiments may take the form of hardware systems and/or apparatuses, software, or combinations thereof. As an example, embodiments may include a computer program product (e.g. software) stored on a computer-readable storage medium comprising one or more executable portions for performing the operations described herein. As another example, one or more apparatuses and/or systems may perform one or more of the operations. In one embodiment, the processor of the set top box may be configured to perform the operations depicted in FIG. 3.

In another embodiment, at least some of the operations of FIG. 3 may be performed by a device other than the set top box. For example, the filtering operation may be performed by a computing device at the data center. According to this example, the set top box receives the command for the filtered IPG from the user and sends the command to the data center. The data center receives the command and filters the IPG according to the command and then sends the filtered IPG to the set top box. The set top box receives the filtered IPG and delivers the filtered IPG to the monitor to be viewed by the user.

Figure 4:
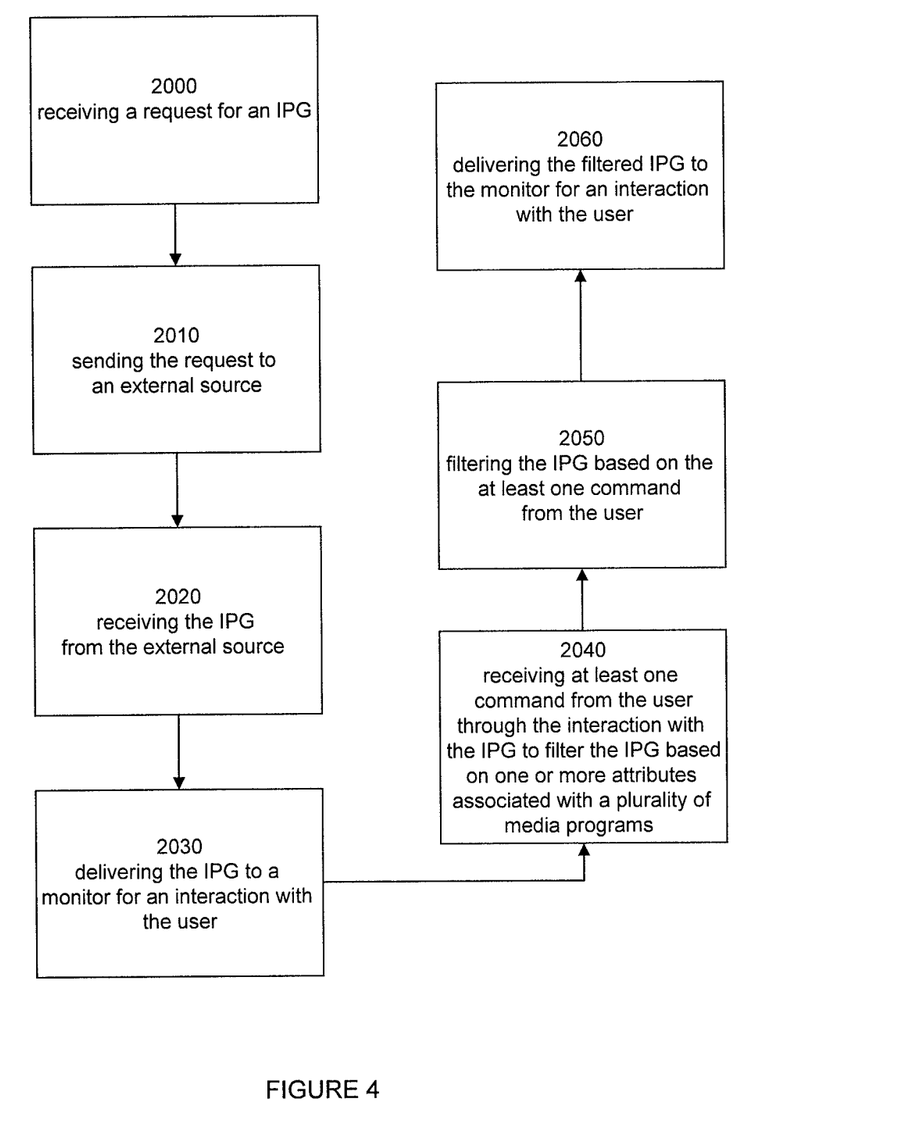
FIG. 4 is a flow chart illustration of a method according to another exemplary embodiment.

FIG. 4 illustrates a method that is consistent with another exemplary embodiment. The method may include receiving a request for an IPG from a user 2000; sending the request to an external source 2010; receiving the IPG from the external source 2020; delivering the IPG to a monitor for an interaction with the user 2030; receiving at least one command from the user through the interaction with the IPG to filter the IPG based on at least one attribute associated with a plurality of media programs 2040; filtering the IPG based on the at least one command from the user 2050; and delivering the filtered IPG to the monitor for an interaction with the user 2060.

Receiving the request may be through the user entering a command through a keypad or remote control device in communication with a set top box or other computing device. The request for the IPG may be sent to an external source such as the data center and, more specifically, a media content server. And the IPG may be sent from the same external source. The IPG may include metadata associated with the media programs listed in the IPG. Delivering the IPG provides a GUI with which the user may interact to view channels and associated media programs. The IPG may also allow the user to enter commands to record a particular media program. The IPG may also allow the user to view at least partially the metadata for the media programs or, more specifically, attributes associated with the media programs. Moreover, the user may select one or more of the attributes to use as a means for filtering the IPG. The processor of the set top box may filter in accordance with the attributes and thereafter display the filtered IPG.

The operations of FIG. 4 may be performed through hardware, software, or combination thereof. Therefore embodiments may take the form of hardware systems and/or apparatuses, software, or combinations thereof. As an example, embodiments may include a computer program product (i.e. software) stored on a computer-readable storage medium comprising of one or more executable portions for performing the operations described herein. As another example, one or more apparatuses and/or systems may perform one or more of the operations. In one embodiment, the processor of the set top box may be configured to perform the operations depicted in FIG. 4.

In another embodiment, at least some of the operations of FIG. 4 may be performed by a device other than the set top box. For example, the filtering operation may be performed by a computing device at the data center. According to this example, the set top box receives the command for the filtered IPG from the user and sends the command to the data center. The data center receives the command and filters the IPG according to the command and then sends the filtered IPG to the set top box. The set top box receives the filtered IPG and delivers the filtered IPG to the monitor to be viewed by the user. It is understood that the set top box described above may be a stand alone device or be integrated within the television. Moreover, a television as used herein may be any monitor capable of displaying the media content from the set top box. For example, a television may be a LCD display or another monitor. While the embodiments of FIGS. 3 and 4 describe the identification of the attributes that define the filter to be based either upon the attributes of a recent media programs (FIG. 3) or upon selections from or via an IPG (FIG. 4), the attributes that define the filter may be entered in other manners, such as be entry by a user in a manner independent of an IPG.

The processor of a set top box or other computing device disclosed herein may be embodied in many ways. For example, a processor may be embodied as a coprocessor, a controller or various other processing means or devices including integrated circuits such as, for example, an application specific integrated circuit ("ASIC"). The memory elements described herein may be various memory structures including volatile and non-volatile memory structures. Any of the memory elements may be configured to store information, data, applications, instructions or the like for enabling the devices disclosed herein to carry out various functions in accordance with exemplary embodiments, such as by storing software that is executable by the processor to cause the various functions of the processor that are described above to be performed. For example, a memory element could be configured to buffer input data for processing by a respective processor. As a more specific example, a memory element of the set top box may buffer the media programming signals for the IPG received from the media content server to facilitate the filtering of the media programming signals by the processor in accordance with the filter.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An apparatus comprising:
a processor that:
receives a request for a television media program;
sends the television media program to a monitor for display thereon;
receives a command to filter an interactive programming guide;
determines that the command is received during a predetermined time period defined to begin with an end of the display of the television media program on the monitor and to end with a media provider scheduled start of another television media program;
filters, in response to the determination that the command is received during the predetermined time period and based on one or more attributes of the displayed television media program, the interactive programming guide to generate a filtered interactive programming guide in which information about one or more television media programs is removed from the interactive programming guide; and
delivers the filtered interactive programming guide in which the information about the one or more television media programs is removed to the monitor for display thereon;
wherein the filtering of the interactive programming guide based on the one or more attributes of the displayed television media program is configured
to be applied once by providing for display the filtered interactive programming guide in which the information about the one or more television media programs is removed, and,
unless an additional command is given, to be automatically rendered inoperative the next time the interactive programming guide is delivered to the monitor for display thereon by automatically providing for display the interactive programming guide in which the information about the one or more television media programs is not removed.

2. The apparatus according to claim 1, wherein the processor further requests and receives the interactive programming guide from an external source; and filters the interactive programming guide in accordance with the command.

3. The apparatus according to claim 1, further comprising at least one memory element; and wherein the processor further:

records the television media program to the at least one memory element;
retrieves the recorded television media program from the at least one memory element in response to receiving the request for the television media program;
sends the television media program to the monitor for display thereon by sending the recorded television media program to the monitor for display thereon; and
filters the interactive programming guide based on the one or more attributes of the displayed television media program by filtering based on one or more metadata attributes of the recorded television media program.

4. The apparatus of claim 1, wherein the processor filters the interactive programming guide based on the one or more attributes of the displayed television media program by filtering the interactive programming guide based on whether the television media program is a new episode or a rerun.

5. The apparatus of claim 1, wherein the processor filters the interactive programming guide based on the one or more attributes of the displayed television media program by limiting channels and television media programs listed in the interactive programming guide.

6. The apparatus of claim 5, wherein the processor:
limits the channels and the television media programs listed in the interactive programming guide by removing information about one or more of the channels and the one or more television media programs from the interactive programming guide; and
delivers the filtered interactive programming guide to the monitor for display thereon by delivering the filtered interactive programming guide to the monitor for display thereon without the removed information about the one or more of the channels and without the removed information about the one or more television media programs.

7. The apparatus of claim 1, wherein the processor further:
receives a request for the interactive programming guide corresponding to an account of a user;
sends the request for the interactive programming guide to a media provider;
receives the interactive programming guide from the media provider, the interactive programming guide including metadata comprising one or more attributes associated with a plurality of television media programs listed in the interactive programming guide, the interactive programming guide being specific to the account of the user and corresponding to programming that is available to the user based on a subscription of the user and a location; and
provides a graphical user interface representation of the interactive programming guide to obtain a user selection of a television media program within the plurality of television media programs to be displayed or recorded.

8. The apparatus according to claim 1, wherein the predetermined time period is defined before the receipt of the command.

9. The apparatus according to claim 1, wherein the processor further:
provides, for display on the monitor during the predetermined time period and in response to the command to filter the interactive programming guide, a view of metadata associated with the television media program, the view of the metadata including a listing of a plurality of attributes of the television media program, the plurality of attributes in the listing selectable by a user to filter the interactive programming guide; and identifies, based on a selection by the user, one or more selected attributes from the plurality of attributes of the television media program;

wherein the filtering of the interactive programming guide is based on the one or more selected attributes from the plurality of attributes.

10. The apparatus according to claim 9, wherein the plurality of attributes of the television media program included in the listing comprises:

a genre of the television media program, a movie studio that produced the television media program, and a media program type of the television media program selected from media program types including movies, series, and specials.

11. The apparatus of claim 1, wherein, prior to the receiving of the command to filter the interactive programming guide, the processor further:

receives a request for the interactive programming guide;

sends the request for the interactive programming guide to an external source;

receives the interactive programming guide from the external source; and delivers the interactive programming guide to the monitor for display thereon.

12. A method comprising:

receiving a request for a television media program;

sending the television media program to a monitor for display thereon;

receiving a command to filter an interactive programming guide;

determining that the command is received during a predetermined time period defined to begin with an end of the display of the television media program on the monitor and to end with a media provider scheduled start of another television media program;

filtering, in response to the determination that the command is received during the predetermined time period and based on one or more attributes of the displayed television media program, the interactive programming guide to generate a filtered interactive programming guide in which information about one or more television media programs is removed from the interactive programming guide; and delivering the filtered interactive programming guide in which the information about the one or more television media programs is removed to the monitor for display thereon;

wherein the filtering of the interactive programming guide based on the one or more attributes of the displayed television media program is configured to be applied once by providing for display the filtered interactive programming guide in which the information about the one or more television media programs is removed, and, unless an additional command is given, to be automatically rendered inoperative the next time the interactive programming guide is delivered to the monitor for display thereon by automatically providing for display the interactive programming guide in which the information about the one or more television media programs is not removed.

13. The method according to claim 12 further comprising requesting the interactive programming guide from an external source; receiving the interactive programming guide from the external source; and filtering the interactive programming guide in accordance with the command.

14. The method according to claim 12 further comprising:

recording a television media program; and retrieving the recorded television media program in response to receiving the request for the television media program;

wherein the sending of the television media program to the monitor for display thereon comprises sending the recorded television media program to the monitor for display thereon; and wherein the filtering of the interactive programming guide based on the one or more attributes of the displayed television media program comprises filtering based on one or more metadata attributes of the recorded television media program.

15. The method according to claim 12, wherein the filtering is performed by a computing device at a data center of a media provider.

16. The method according to claim 12, further comprising:

receiving, by way of the interactive programming guide displayed on the monitor, a user selection of a television media program represented in the interactive programming guide; and providing, for display on the monitor, a view of metadata associated with the selected television media program for use by a user to select one or more attributes listed in the metadata to be used to filter the interactive programming guide.

17. A non-transitory computer-readable storage medium encoded with computer-readable program code portions, the computer-readable program code portions comprising:

a first executable portion for receiving a request for a television media program;

a second executable portion for sending the television media program to a monitor for display thereon;

a third executable portion for receiving a command to filter an interactive programming guide;

a fourth executable portion for determining that the command is received during a predetermined time period defined to begin with an end of the display of the television media program on the monitor and to end with a media provider scheduled start of another television media program;

a fifth executable portion for filtering, in response to the determination that the command is received during the predetermined time period and based on one or more attributes of the displayed television media program, the interactive programming guide to generate a filtered interactive programming guide in which information about one or more television media programs is removed from the interactive programming guide; and a sixth executable portion for delivering the filtered interactive programming guide in which the information about the one or more television media programs is removed to the monitor for display thereon;

wherein the filtering of the interactive programming guide based on the one or more attributes of the displayed television media program is configured to be applied once by providing for display the filtered interactive programming guide in which the information about the one or more television media programs is removed, and, unless an additional command is given, to be automatically rendered inoperative the next time the interactive programming guide is delivered to the monitor for display thereon by automatically providing for display the interactive programming guide in which the information about the one or more television media programs is not removed.

18. The non-transitory computer-readable storage medium according to claim 17, further comprising a seventh executable portion for requesting the interactive programming guide from an external source; an eighth executable portion for receiving the interactive programming guide from the external source; and a ninth executable portion filtering the interactive programming guide in accordance with the command.

19. The non-transitory computer-readable storage medium according to claim 17, further comprising:
a seventh executable for recording the television media program; and
an eighth executable portion for retrieving the recorded television media program in response to receiving the request for the television media program;
wherein the second executable portion sends the television media program to the monitor for display thereon by sending the recorded television media program to the monitor for display thereon; and
wherein the fifth executable portion filters the interactive programming guide based on one or more attributes of the displayed television media program by filtering the interactive program guide based on one or more metadata attributes of the recorded television media program.

20. A method comprising:
receiving a request for a television media program;
sending the television media program to a monitor for display thereon;
providing a temporal proximity time period for receiving a command to filter an interactive programming guide based on one or more attributes of the displayed television media program, the temporal proximity time period comprising a duration of the display of the television media program on the monitor and an additional predetermined period beginning with an end of the display of the television media program on the monitor and ending with a media provider scheduled start of a display of another television media program;
receiving a command to filter the interactive programming guide;
determining whether the receipt of the command occurred within the temporal proximity time period;
when the receipt of the command is determined to have occurred within the temporal proximity time period, filtering, based on the one or more attributes of the television media program, the interactive programming guide to generate a filtered interactive programming guide in which information about one or more television media programs is removed from the interactive programming guide; and
delivering the filtered interactive programming guide in which the information about the one or more television media programs is removed to the monitor for display thereon;
wherein the filtering of the interactive programming guide based on the one or more attributes of the displayed television media program is configured
to be applied once by providing for display the filtered interactive programming guide in which the information about the one or more television media programs is removed, and,
unless an additional command is given, to be automatically rendered inoperative the next time the interactive programming guide is delivered to the monitor for display thereon by automatically providing for display the interactive programming guide in which the information about the one or more television media programs is not removed.

21. The method of claim 20, wherein the predetermined time period is defined before the receipt of the command to filter.

* * * * *